US009342710B2

(12) United States Patent
Tiemeijer

(10) Patent No.: US 9,342,710 B2
(45) Date of Patent: May 17, 2016

(54) ELECTRONIC TAMPER DETECTION

(71) Applicant: NXP B.V., Eindhoven (NL)

(72) Inventor: Lukas Frederik Tiemeijer, Eindhoven (NL)

(73) Assignee: NXP B.V., Eindhoven (NL)

( * ) Notice: Subject to any disclaimer, the term of this patent is extended or adjusted under 35 U.S.C. 154(b) by 215 days.

(21) Appl. No.: 14/086,276

(22) Filed: Nov. 21, 2013

(65) Prior Publication Data
US 2015/0143551 A1    May 21, 2015

(51) Int. Cl.
*G06F 21/70* (2013.01)
*G06K 19/073* (2006.01)
*H01L 23/00* (2006.01)
*H01L 23/64* (2006.01)

(52) U.S. Cl.
CPC .......... *G06F 21/70* (2013.01); *G06K 19/07309* (2013.01); *G06K 19/07372* (2013.01); *H01L 23/576* (2013.01); *H01L 23/645* (2013.01); *H01L 2224/48091* (2013.01); *H01L 2224/48247* (2013.01); *H01L 2224/49175* (2013.01)

(58) Field of Classification Search
CPC ............... G06F 21/00; G06F 21/70–21/72; G06F 21/75–21/78; G06F 21/81; G06F 21/86; H01L 23/06; H01L 23/08; H01L 23/12; H01L 23/14; H01L 23/15; H01L 23/24; H01L 23/28–23/296; H01L 23/3155; H01L 23/3164; H01L 23/576; G06K 19/07309; G06K 19/07372; G06K 19/07381
See application file for complete search history.

(56) References Cited

U.S. PATENT DOCUMENTS

| 4,340,974 | A | * | 7/1982 | Cooke et al. ................... 455/258 |
|---|---|---|---|---|
| 4,728,922 | A | * | 3/1988 | Christen et al. ............... 340/991 |
| 4,763,085 | A | * | 8/1988 | Lamberg ......................... 331/56 |
| 5,045,814 | A | * | 9/1991 | English et al. .................. 331/86 |
| 5,099,228 | A | * | 3/1992 | Israel et al. ................ 340/572.1 |
| 5,952,893 | A | * | 9/1999 | Ghoshal .................... 331/108 C |
| 6,201,296 | B1 | * | 3/2001 | Fries et al. ..................... 257/679 |
| 6,512,422 | B2 | * | 1/2003 | Dufour et al. ................. 331/167 |
| 7,005,733 | B2 | | 2/2006 | Kommerling et al. |
| 7,549,064 | B2 | * | 6/2009 | Elbert et al. .................. 713/194 |
| 7,757,083 | B2 | | 7/2010 | Devadas et al. |
| 8,174,325 | B1 | * | 5/2012 | Leung et al. ...................... 331/2 |
| 8,275,572 | B2 | * | 9/2012 | Burns et al. ................... 702/158 |
| 8,427,251 | B2 | * | 4/2013 | Quevy et al. .................. 331/176 |
| 8,933,706 | B1 | * | 1/2015 | Karlquist ...................... 324/633 |
| 2004/0193877 | A1 | * | 9/2004 | Grassl ........................... 713/164 |
| 2005/0021993 | A1 | * | 1/2005 | De Jongh et al. ............. 713/200 |
| 2009/0109005 | A1 | * | 4/2009 | Woodard et al. ............. 340/10.4 |

(Continued)

OTHER PUBLICATIONS

Lee, T. H. et al. "Oscillator Phase Noise: A Tutorial", IEEE Journal of Solid-State Circuits, vol. 35, No. 3, pp. 326-336 (Mar. 2000).
Poore, R. "Overview on Phase Noise and Jitter", Agilent Technologies, retrieved from the Internet at: cp.literature.agilent.com/litweb/pdf/5990-3108EN.pdf (May 17, 2001).

(Continued)

*Primary Examiner* — Eric W Shepperd

(57) ABSTRACT

An apparatus, method and package for electronic tamper detection. In one example, an apparatus, device or package for electronic tamper detection includes: a first inductor positioned at a first distance from a first conductive surface; a first oscillator generating a first frequency in dependence upon the first inductor; and a comparator setting a tamper detected status if the generated first frequency is not within an error tolerance to a pre-stored first frequency. One example of a method for fabricating an electronic tamper detection apparatus, device, or package is also provided.

8 Claims, 4 Drawing Sheets

(56) References Cited

U.S. PATENT DOCUMENTS

| | | | |
|---|---|---|---|
| 2010/0187527 A1* | 7/2010 | Van Geloven et al. | 257/48 |
| 2010/0219183 A1* | 9/2010 | Azancot | H02J 5/005 219/676 |
| 2010/0224958 A1 | 9/2010 | Tiemeijer | |
| 2010/0283456 A1 | 11/2010 | Zieren et al. | |
| 2012/0286887 A1* | 11/2012 | Chang | 331/108 R |
| 2014/0191828 A1* | 7/2014 | Nakase | H01Q 13/20 333/239 |

OTHER PUBLICATIONS

Bhansali, P. et al. "Gen-Adler: The Generalized Adler's Equation for Injection Locking Analysis in Oscillators", IEEE Design Automation Conference, pp. 522-527 (Jan. 2009).

Zhao, F. et al. "A 0.6V Quadrature VCO with Optimized Capacitive Coupling for Phase Noise Reduction", IEEE Custom Integrated Circuits Conference, pp. 1-4 (2011).

* cited by examiner

US 9,342,710 B2

ELECTRONIC TAMPER DETECTION

BACKGROUND

Brief Background Introduction

This specification relates generally to systems and methods for security and in one example to systems, methods, and devices for tamper detection. Further improvements to such systems, methods, and devices are desired.

SUMMARY

An apparatus for electronic tamper detection, comprising: a first inductor positioned at a first distance from a first conductive surface; a first oscillator generating a first frequency in dependence upon the first inductor; and a comparator setting a tamper detected status if the generated first frequency is not within an error tolerance to a pre-stored first frequency.

A method for fabricating an electronic tamper detection device, comprising: positioning a first inductor at a first distance from a first conductive surface; positioning a second inductor at a second distance from a second conductive surface; coupling a first oscillator to the first inductor, for generating a first frequency in dependence upon the first inductor; coupling a second oscillator to the second inductor, for generating a second frequency in dependence upon the second inductor; and coupling a comparator, having a memory, to the first and second oscillators, for calculating a measured relation between the first frequency and the second frequency, and setting a tamper detected status if the measured relation is not within an error tolerance to a relation pre-stored in the memory.

The above summaries of the present disclosure are not intended to represent each disclosed embodiment, or every aspect, of the present invention. Other aspects and example embodiments are provided in the Figures and the detailed description that follow.

Figure 1A:
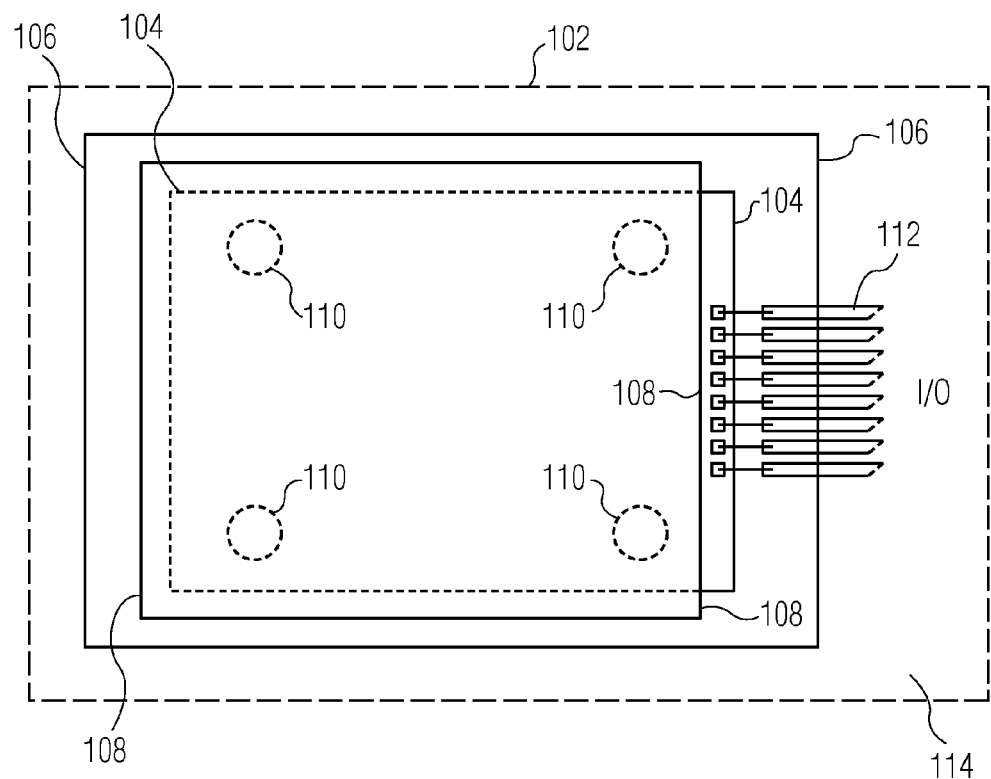
FIG. 1A is one example of a top view of a first apparatus for electronic tamper detection.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Integrated circuits (IC's) for applications such as electronic passports, smartcards, and RF-ID tags often contain a secret security key and carry out secret functions. These IC's need to be secure against reverse engineering attacks which aim to retrieve their secrets.

After removal from their protective encapsulation, these IC's may be subject to both front-side (circuitry side) as well as back-side (through substrate) attacks. These attacks may include various analysis techniques such as light or photon emission detection, thermal infrared detection, liquid crystal detection, voltage or electric field detection and magnetic field detection.

Often these methods are used in combination with invasive attacks such as wafer thinning, laser cutting and heating, and focused ion beam techniques. Also light or laser flash methods are used from the back-side to force signals to flip. When anyone of the above mentioned techniques is used in combination with mathematical attacks, these attacks can lead to discovery of the secret security key.

One example protection scheme uses a magnetic field generated by an encapsulation to generate a security key useful for authorization, encryption and/or decryption. Tampering with the encapsulation corrupts the security key, making the key unusable. Other protection schemes are designed using capacitive sensors, reading a key from the random dielectric properties of the encapsulation, or using integrated light sources, reading a key from optical properties of an encapsulation using photo detectors.

A protection scheme using inductors and oscillators is now discussed.

Figure 1B:
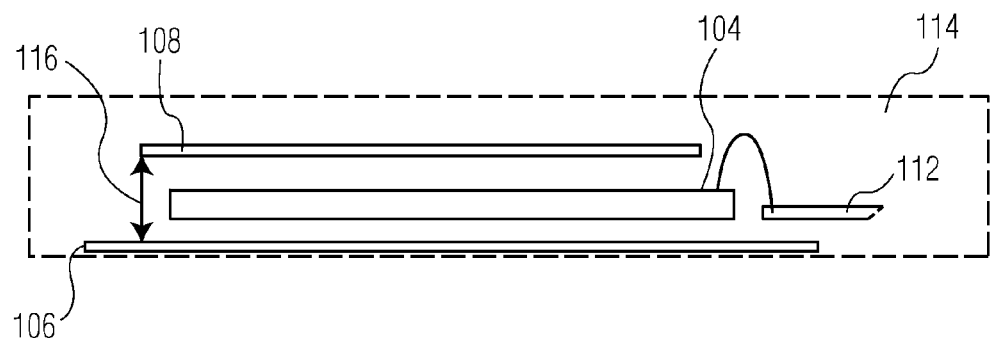
FIG. 1B is one example of a side view of the first apparatus for electronic tamper detection.

FIG. 1A is one example of a top view of a first apparatus for electronic tamper detection, and FIG. 1B is one example of a side view of the first apparatus for electronic tamper detection. These Figures are discussed together.

The apparatus, in one example, is formed in a package 102. The package 102 includes a circuit 104. The circuit 104 can take a variety of forms, including that of a silicon chip. The circuit 104 includes four inductors 110 placed proximate to the four corners of the circuit 104 and between the conductive surfaces 106 and 108. The circuit 104 also includes an I/O bus 112 for communication with devices outside of the package 102. Fabrication of the circuit 104 is compatible with standard digital complementary metal-oxide-semiconductor (CMOS) processing steps.

A first conductive surface 106 is placed on one side of the circuit 106 (e.g. under a back-side of the chip) and a second conductive surface 108 is placed on another side of the circuit 106 (e.g. over a top-side of the chip).

The conductive surfaces 106 and 108 in one example do not touch the circuit 104 directly but are separated from the circuit 104 by a dielectric 114, such as an epoxy resin. The dielectric 114 having a thickness which keeps the conductive surfaces 106 and 108 separated by a distance 116. Variations in a thickness of the dielectric 114 causes the distance 116 to vary from a mean (i.e. average) value. In one example, these variations are used to generate a secret security key and/or carry out secret functions within the package 102 or in devices connected to the package 102 through the I/O bus 112. Details of how the secret security key is generated and how to carry out secret functions is discussed below.

The conductive surfaces 106 and 108 in one example are metal foils or metal plates which are layered on top of the dielectric 114. The conductive surfaces 106 and 108 do not need to be encapsulated in the dielectric resin. The top conductive surface 108 may need to be reduced in size or have a cutout in order to allow bond wires to be connected between the circuit 104 and the I/O bus 112.

The circuit 104 in this example includes four free-running RF oscillator circuits (see FIG. 2) each including one of the four inductors 110. Each oscillator circuit's output frequency depends upon how each associated inductor 110 is affected by a distance from the inductor and the first conductive surface 106, a distance from the inductor and the second conductive surface 108, and the distance 116 between the conductive surfaces 106 and 108.

Specific inductor and distance 116 parameters are selected so as to produce a detectable frequency changes when either or both of the conductive surfaces 106 and 108 are tampered with. As the distance 116 between the conductive surfaces 106 and 108 is increased the effect of the conductive surfaces 106 and 108 on oscillator frequency is lessened, and tampering is more difficult to detect.

In one example, one of the oscillator circuit frequencies is used as a reference. The other three oscillator circuit frequencies are compared to this reference frequency to generate a set of frequency ratios. A portion of a security key is generated from each of the three frequency ratios. Each of these security key portions are then combined into a larger security key. Thus, by comparing these frequencies from the set of free-running RF oscillators, a secret key unique to each individual chip package 102 is generated.

In one example variations in the frequencies generated by each of these four oscillator circuits is purposefully designed into the package 102 and circuit 104. In another example, variations in the frequencies generated by each of these four oscillator circuits is captured from normal package 102 fabrication tolerance variations, such as the variations in the thickness of the dielectric resin discussed above. A specific example of how normal package 102 fabrication variances can be used to generate a security key is presented below.

At a time of manufacture or initialization of the package 102, a value of some sort representing one oscillator frequency, or a relation between more than one of the oscillator frequencies, is pre-stored in a non-volatile memory within the circuit 104. The value can be an absolute value of an oscillator frequency, or a table of absolute values of an oscillator frequency at various temperatures. The value can also be a code or a security key derived from the absolute value of the oscillator frequency. The relation can be a mathematical relation, a difference, a ratio, a code, or a security key generated by a comparison between two or more of the oscillator frequencies.

Verification, at a time after manufacture or initialization, that the package 102 has not been tampered with occurs when a measured value for the each of the oscillator frequencies, each of the frequency ratios, each of the security key portions, and/or the larger security key is determined to be within an error tolerance to (e.g. approximately equal to) the stored oscillator frequencies, frequency ratios, security key portions, and/or larger security key. When these match, the circuit 104 transmits a message over the I/O bus 112 enabling operation of other devices and/or applications.

Tampering with (i.e. removing, puncturing, etc.) one or more of the conductive surfaces 106 and 108 disturbs how the conductive surfaces 106 and 108 interact with the inductors 110 and thus alters the measured oscillator frequencies, frequency ratios, security key portions, and/or larger security key. When the circuit 104 determines that the measured and stored values do not match, then in various example embodiments, the circuit 104 can: transmit a message over the I/O bus 112 blocking operation of other devices and/or applications; erase the stored oscillator frequencies, frequency ratios, security key portions, and/or larger security key values; and/or set a tamper detected status. Thus tampering with the conductive surfaces 106 and 108 changes the effective inductance seen by the oscillators and thus disturbs the oscillators frequencies leading to new formed keys that do not match with the previously stored keys;

In one example, four inductors 110 are placed at four corners of the circuit 104 to detect tampering. Different package 102 configurations can use a different number of inductors placed at other locations, perhaps including one at a center of the circuit 104.

In an alternate example, just one frequency from one inductor 110 and associated oscillation circuit is compared with a stored value to determine if the conductive surfaces 106 and 108 have been tampered with. Since the absolute value of an oscillator's frequency can vary with temperature, this example of the package 102 would incorporate a circuit 104 temperature value derived either from a temperature sensor in the package 102 or in an external device (e.g. a smart-card reader) to which the package 102 is connected.

Figure 2:
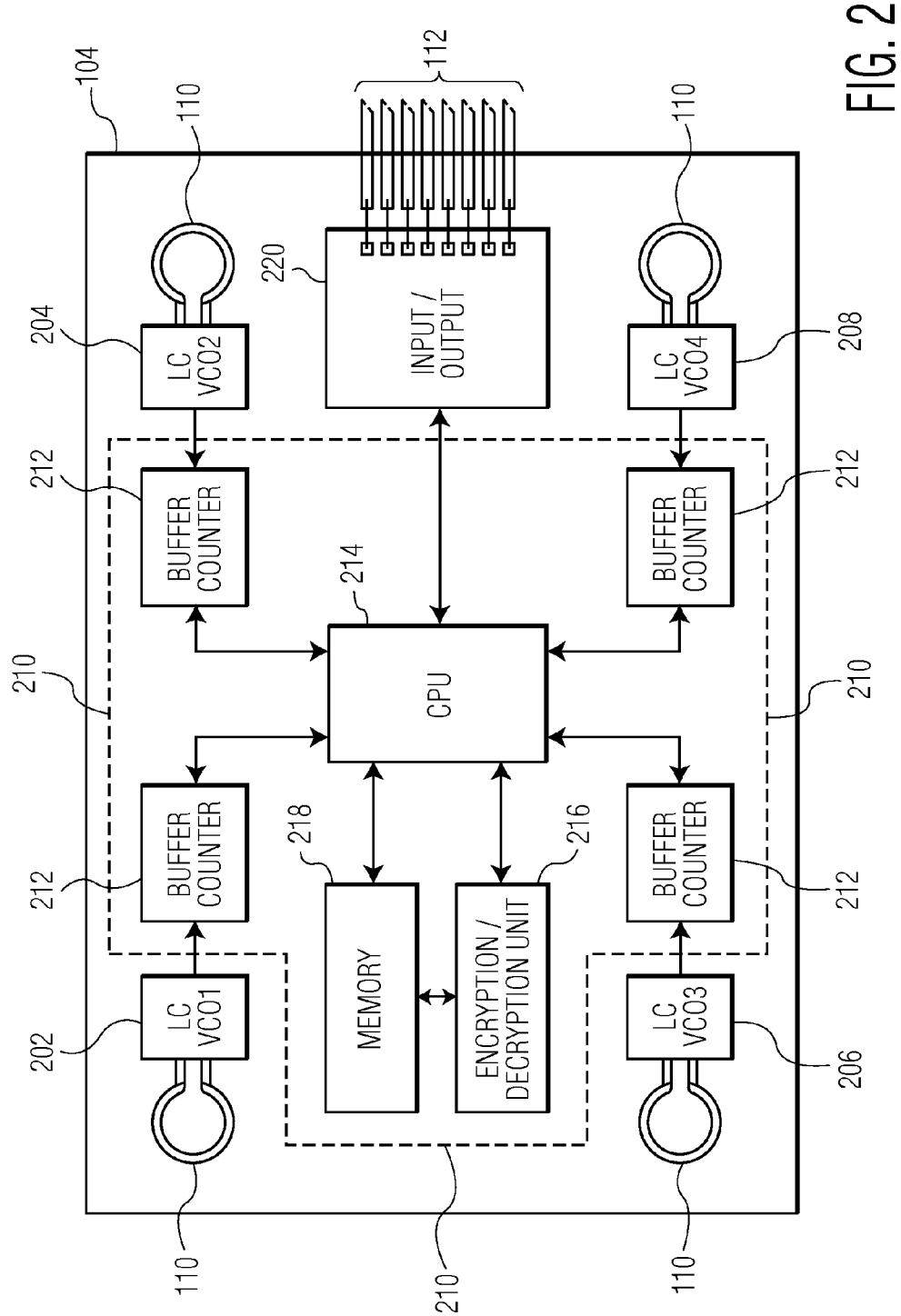
FIG. 2 is one example of a circuit within the first apparatus for electronic tamper detection.

FIG. 2 is one example of a circuit 104 within the first apparatus for electronic tamper detection. The circuit 104 includes a first oscillator 202, a second oscillator 204, a third oscillator 206, and a fourth oscillator 208 each coupled to one of the inductors 110. Although shown as having only one turn, the integrated inductors 110 may have multiple turns in order to increase their inductance.

Each of the oscillators 202, 204, 206, 208 is also coupled to a comparator circuit 210. The comparator circuit 210 includes a set of frequency counters 212, a CPU (central processing unit or microcontroller) 214, an encryption/decryption unit 216, a non-volatile memory 218 and an I/O unit 220. Each of the frequency counters 212 is coupled to monitor the oscillators' 202, 204, 206, 208 frequencies and transmit a corresponding frequency count value to the CPU 214.

The CPU 214 retrieves instructions stored in the encryption/decryption unit 216. Depending upon an example embodiment, the instructions cause the CPU 214 to compare: each oscillator's measured frequency to an initial frequency pre-stored in the memory 218; calculated oscillator frequency ratios to initial frequency ratios pre-stored in the memory 218; portions of a security key generated by each ratio to initial portions pre-stored in the memory 218; or a larger security key generated by the set of frequency ratios to an initial larger security key pre-stored in the memory 218.

As introduced above, deviations between the measured, calculated, derived or generated values and the pre-stored values indicates whether the package 102 has been tampered with. In one example, if tampering has been detected then all of the pre-stored secret security keys are erased, thereby preventing an attacker from retrieving any encrypted data.

If the inductors 110 are of approximately the same structural dimensions, the oscillators 202, 204, 206, 208 will run at approximately the same frequency. In such a scenario, mutual injection locking due to inductive coupling between the oscillators 202, 204, 206, 208 could cause the oscillators 202, 204, 206, 208 run at exactly the same frequency. If such mutual locking occurs, the comparator 210 may set the tampering detected status even though the conductive surfaces 106 and 108 have not been tampered with.

A differential equation known as Adler's equation calculates an oscillator's phase difference with the injection signal. This equation describes injection locking dynamics in inductor-capacitor (LC) oscillators. The equation defines an injection locking range ($f_L$) as:

$$f_L = (f_{osc} V_i)/QV$$

$V_i$ is the injected signal coming from an inductive coupling with any of the other oscillators, and V is the oscillator signal and Q is the Q-factor of the resonator tank. Mutual injection locking can also occur when oscillators draw power from a same power supply. This occurs since the current drawn by the oscillators fluctuates with oscillation frequencies potentially coupling them.

To ensure that mutual injection locking does not occur when the package 102 is in its un-tampered state, the oscillators 202, 204, 206, 208 are designed such that a difference between their oscillation frequencies is greater than the injection locking range defined by the equation above. Additional capacitors and inductors are also added to filter out power supply current fluctuations. Reducing the distance 116 between the conductive surfaces 106 and 108 and between each of the conductive surfaces 106 and 108 and the inductors 110 also reduces the injection locking range.

Package 102 and circuit 104 designs having a smaller injection locking range enable a greater a number of possible key values since the oscillators 202, 204, 206, 208 can have a lower minimum relative difference in oscillation (i.e. the oscillators 202, 204, 206, 208 can have more closely matched frequencies without mutual frequency locking occurring).

While in the example above, mutual injection locking is undesirable; in another example mutual injection locking can add an additional layer of security if the oscillator 202, 204, 206, 208 frequencies are selected such that their difference is greater than the injection locking range when the package 102 is in an un-tampered state and is less than the injection locking range when the package 102 has been tampered with. In such an example, a simpler comparator which places the package 102 into a tamper detected status when the oscillator frequencies are equal can be used. Such an example embodiment will reduce a key space available for detecting tampering.

Figure 3A:
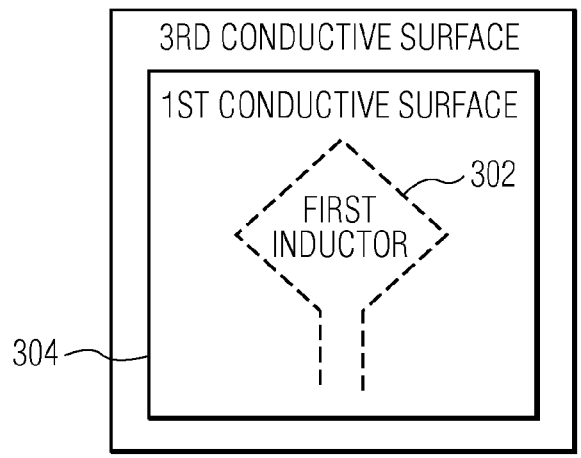
FIG. 3A is one example of a top view of a first portion of a second apparatus for electronic tamper detection.
Figure 3B:
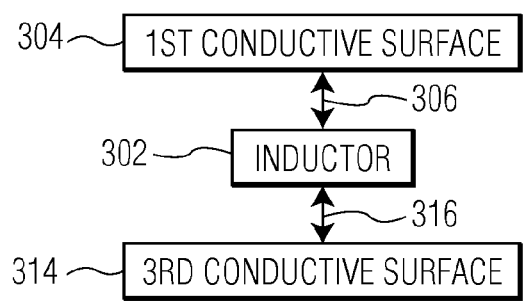
FIG. 3B is one example of a side view of the first portion of the second apparatus for electronic tamper detection.
Figure 3C:
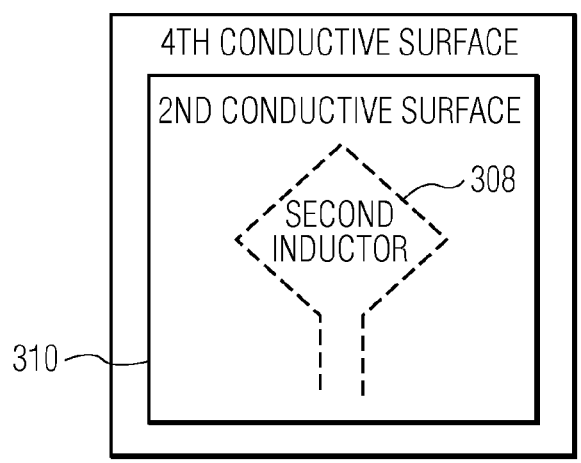
FIG. 3C is one example of a top view of a second portion of the second apparatus for electronic tamper detection.
Figure 3D:
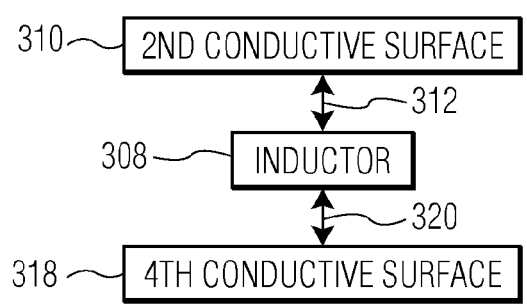
FIG. 3D is one example of a side view of the second portion of the second apparatus for electronic tamper detection.

FIG. 3A is one example of a top view of a first portion of a second apparatus for electronic tamper detection. FIG. 3B is one example of a side view of the first portion of the second apparatus for electronic tamper detection. FIG. 3C is one example of a top view of a second portion of the second apparatus for electronic tamper detection. FIG. 3D is one example of a side view of the second portion of the second apparatus for electronic tamper detection. These Figures are now discussed together and represent a variation on the first apparatus shown in FIGS. 1 and 2.

In the first apparatus of FIGS. 1 and 2, four inductors 110 were shown instantiated between two contiguous conductive surfaces 106 and 108. In this second apparatus of FIGS. 3A, B, C and D, just two inductors are shown between separate conductive surfaces on either side of the inductors. These separate conductive surfaces can in one example be placed at very different locations within a circuit and/or package and a comparison can still be made between frequencies generated using each of the inductors so as to generate a ratio, a difference, a code, a key, etc.

FIGS. 3A and 3B show a first inductor 302 separated from a first conductive surface 304 by a first distance 306; and FIGS. 3C and 3D show a second inductor 308 separated from a second conductive surface 310 by a second distance 312. FIGS. 3A and 3B also show the first inductor 302 separated from a third conductive surface 314 by a third distance 316; and FIGS. 3C and 3D show the second inductor 308 separated from a fourth conductive surface 318 by a fourth distance 320.

In one example, only the first and second conductive surfaces 304 and 310 are used. In another example, all four of the conductive surfaces 304, 310, 314 and 318 are used.

In another example, neither the first and second conductive surfaces 304 and 310 nor the third and fourth conductive surfaces 314 and 318 are connected to each other. The first, second, third and fourth distances 306, 312, 316 and 320 can be substantially different as well.

A first operational example of the apparatus is now presented. The operational embodiment presents specific operational parameters and calculations, mainly in the context of the example embodiment discussed in FIGS. 1 and 2.

In this example, the circuit 104 is designed such that the inductors 110 cause the oscillators to oscillate at 1 GHz in the absence of the conductive surfaces 106 and 108.

If a distance 116 between the two conductive surfaces 106 and 108 is set approximately equal to the diameter of the inductors 110, then the inductor's 110 inductance will be reduced by approximately 4%.

Since $f_{osc} \sim 1/(\text{Sqrt. of } L*C)$, assuming C is constant, the 1 GHz oscillator 202, 204, 206, 208 frequencies will shift higher by 2% (i.e. by 20 MHz) to 1020 MHz. Thus complete removal of the conductive surfaces 106 and 108 could be detected by any one of the oscillators 202, 204, 206, 208 since their oscillation frequencies would shift by 20 MHz back down to 1 GHz.

Generation of an available security key-space, however, is dependent upon frequency variations between the oscillators 202, 204, 206, 208 when the conductive surfaces 106 and 108 remain in place and undisturbed. In this example, such frequency variations between uniformly fabricated oscillators 202, 204, 206, 208 derives from normal fabrication tolerance variations, such as a 5% dielectric resin thickness variation about the circuit 104 which then causes the conductive surfaces 106 and 108 to vary from their normal distance by 5% as well.

Using this example's parameters, 5% times 20 MHz=a 1 MHz spread in the oscillators' 202, 204, 206, 208 oscillation frequencies. Thus with the conductive surfaces 106 and 108 in place and undisturbed, the oscillators 202, 204, 206, 208 frequencies will differ within a range of 1019.5 MHz to 1020.5 MHz.

For each production package 102 and circuit 104, random fabrication process variations will give rise to a specific set of fixed frequency variations between the oscillators 202, 204, 206, 208. Such a 1 MHz ($10^6$) spread in oscillation frequencies could be captured with a 20-bit binary code (i.e. 2^10=10485576 which will cover the $10^6$ frequency spread).

Four oscillators 202, 204, 206, 208, three of which 204, 206 and 208 each differing from a reference oscillator 202 by 1 MHz, can be used to generate a larger 60-bit security code key (i.e. 20-bits+20-bits+20-bits).

In the above example, each of the oscillators 202, 204, 206, 208 are presumed to be equally affected by temperature. Also, a portion of the 1 MHz key-space which is within the mutual injection locking range is not used so that the oscillator 202, 204, 206, 208 frequencies can remain differentiated. In other example embodiments a larger key-space can be created.

Oscillator phase noise (i.e. timing jitter) can, in addition to mutual injection locking, limit the available key-space. The phase noise of an oscillator has a Lorenzian L(f) spectrum given by:

$$L(f) = \frac{1}{\pi} \frac{\pi f_{osc}^2 c}{(\pi f_{osc}^2)^2 + f^2} \sim C \frac{f_{osc}^2}{f^2}$$

Assuming that the thermal noise generated in the loss resistance of the LC-tank is the only source of the phase noise, then the constant:

$$c = \frac{2kT}{4PQ^2}$$

The absolute phase noise (i.e. timing jitter) of the oscillator is now $$\sigma_{abs}^2(t) = ct$$

With an oscillator power P=1 mW and a tank Q=10 the accumulated timing jitter after a 1 second oscillator counting period is only 0.15 nsec, or $\frac{1}{6}^{th}$ of a cycle when the oscillator is running at 1 GHz. The impact of the phase noise is low enough to resolve frequency differences down to 1 Hz for a one second counting period. Typically for state of the art CMOS LC oscillator the constant c is between 10 and 100× of this theoretical limit.

When an impact of 1/f noise is included, the oscillator phase noise spectrum becomes a convolution of a Lorenzian with a Gaussian spectrum and the timing jitter increases. Ignoring 1/f noise only gives reasonable results when the jitter measurement time is less the reciprocal of the 1/f noise corner frequency. The $1/f^3$ corner in the phase noise spectrum of a well designed LC-oscillator can be as low as 3 kHz for a device with a 1/f noise corner of 200 kHz.

So-far for simplicity a 1 second counting time period was used. For an actual application however it is probably more realistic to assume there is only 1 millisecond available to count the frequencies of the oscillators. When such a short counting period is selected the key space is reduced from 60 bit to 30 bit. However, now the theoretical timing jitter is only 5 psec. or 0.5% of the oscillation period. Even for realistic oscillators 202, 204, 206, 208 suffering from excess noises, where the phase noise is 100× the theoretical limit we get a timing jitter which is 5% of the oscillation period and which provides a comfortable margin.

While in one example a 30-bit key-length is insufficient for cryptographic purposes, on-chip techniques can use the 30-bit key to generate longer keys. As shown by this example embodiment, the selection of the oscillator's 202, 204, 206, 208 frequencies and a counting period affect the key-length which can be extracted from the circuit enclosure.

Mutual injection locking can be added to the above example to provide an additional layer of security, albeit at the cost of reducing an available key space. For example, with an oscillation frequency of 1 GHz, and the oscillators place on the circuit 104 at a distance from each other equal to 5 times the diameter of the inductors 110, the mutual locking range will approximately equal 2 kHz. Adding conductive surfaces 106 and 108 at a distance equal to the inductor's 110 diameter will substantially reduce the locking range to 2 Hz. Tampering by removing one of the conductive surfaces 106 or 108, however, will expand the locking range to 100 Hz. If the oscillators 202, 204, 206, 208 are designed so that their frequencies can be set, using for example switched capacitors, to differ by more than 2 Hz, but by less than 100 Hz, then the removal of one of the conductive surfaces 106 or 108 will cause the oscillators 202, 204, 206, 208 to lock, and the comparator 210 will set the tamper detected status. Use of this additional security will reduce a number of possible keys since the oscillator 202, 204, 206, 208 frequencies will be limited to a 98 Hz range of differences.

A second operational example of the apparatus is also presented. The operational embodiment presents one possible operational flow, mainly in the context of the example embodiment discussed in FIGS. 1 and 2. To begin, oscillators 202, 204, 206, 208 in the package 102 are powered-up. The comparator circuit 210 monitors each of the frequency counters 212. Once one of the frequency counters 212 reaches a predetermined number of counts (e.g. 1000000), the comparator circuit 210 reads the frequency counts from the remaining three counters 212. Assuming the oscillators run at ~1 GHz, this will happen ~1 ms after power-up. The comparator circuit 210 then generates a 30-bit key from ratios between the frequency counts from the four counters 212. The comparator circuit 210 compares the generated 30-bit to a pre-stored 30-bit key which was generated when the chip was in an un-tampered state (e.g. at manufacturing or initialization time). If the two 30-bit codes match, the package 102 permits operation of a device, application, system, etc. If the two 30-bit codes do not match, then the comparator circuit 210 erases pre-stored key values in the package 102 and/or in devices, applications, systems, etc. coupled to the package 102. If the two 30-bit codes do not match, then the comparator circuit 210 also blocks operation of devices, applications, systems, etc. coupled to the package 102.

Figure 4:
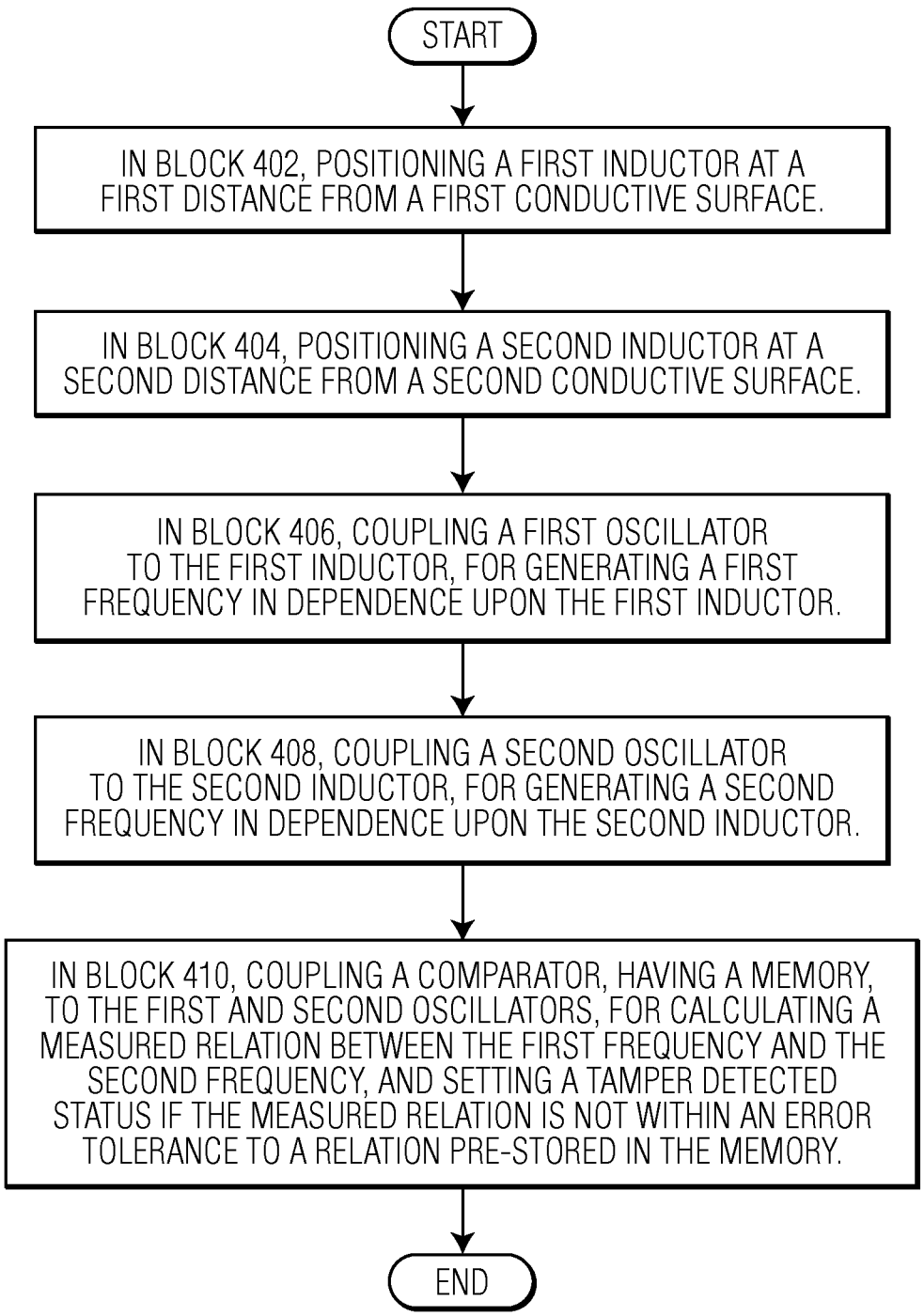
FIG. 4 is one example of a flowchart for fabricating an electronic tamper detection device.

FIG. 4 is one example of a flowchart for fabricating an electronic tamper detection device. In block 402, positioning a first inductor at a first distance from a first conductive surface. In block 404, positioning a second inductor at a second distance from a second conductive surface. In block 406, coupling a first oscillator to the first inductor, for generating a first frequency in dependence upon the first inductor. In block 408, coupling a second oscillator to the second inductor, for generating a second frequency in dependence upon the second inductor. In block 410, coupling a comparator, having a memory, to the first and second oscillators, for calculating a measured relation between the first frequency and the second frequency, and setting a tamper detected status if the measured relation is not within an error tolerance to a relation pre-stored in the memory.

The blocks comprising the flowcharts in the above Figures can be effected in any order, unless a specific order is explicitly stated. Also, those skilled in the art will recognize that while one example method embodiment is now discussed, the material in this specification can be combined in a variety of ways to yield other examples as well. The method next discussed is to be understood within a context provided by this and other portions of this detailed description.

Functional and software instructions described above are typically embodied as a set of executable instructions which are effected on a computer which is programmed with and controlled by said executable instructions. Such instructions are loaded for execution on a processor (such as one or more CPUs). The processor includes microprocessors, microcontrollers, processor modules or subsystems (including one or more microprocessors or microcontrollers), or other control or computing devices. A processor can refer to a single component or to plural components.

In one example, one or more blocks or steps discussed herein are automated. In other words, apparatus, systems, and methods occur automatically. The terms automated or automatically (and like variations thereof) mean controlled operation of an apparatus, system, and/or process using computers and/or mechanical/electrical devices without the necessity of human intervention, observation, effort and/or decision.

In some examples, the methods illustrated herein and data and instructions associated therewith are stored in respective storage devices, which are implemented as one or more non-transient computer-readable or computer-usable storage media or mediums. The non-transient computer-usable media or mediums as defined herein excludes signals, but such media or mediums may be capable of receiving and processing information from signals and/or other transient mediums.

The storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed, floppy and removable disks; other magnetic media including tape; and optical media such as Compact Disks (CDs) or Digital Versatile Disks (DVDs).

Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In this specification, example embodiments have been presented in terms of a selected set of details. However, a person of ordinary skill in the art would understand that many other example embodiments may be practiced which include a different selected set of these details. It is intended that the following claims cover all possible example embodiments.

What is claimed is:

1. An apparatus for electronic tamper detection, comprising:
   a first inductor positioned at a first distance from a first conductive surface;
   a first oscillator generating a first frequency in dependence upon the first inductor;
   a second inductor positioned at a second distance from a second conductive surface;
   a second oscillator generating a second frequency in dependence upon the second inductor; and
   a comparator that calculates a measured relation between the first frequency and the second frequency and sets a tamper detected status when the measured relation is not within an error tolerance to a pre-stored relation;
   wherein a difference between the first frequency and the second frequency is greater than a mutual injection locking range.

2. The apparatus of claim 1:
   further comprising a temperature sensor measuring a temperature; and
   the comparator setting the tamper detected status when the generated first frequency is not within the error tolerance to a pre-stored first frequency which is dependent upon the measured temperature.

3. The apparatus of claim 1: wherein the relation is at least one from a group consisting of: a mathematical relation, a difference, a ratio, a code, and a security key.

4. The apparatus of claim 1:
   wherein a difference between the first frequency and the second frequency is greater than a first mutual injection locking range when the apparatus is in an un-tampered state; and
   wherein the difference between the first frequency and the second frequency is less than a second mutual injection locking range when the apparatus is in a tampered state.

5. The apparatus of claim 1:
   wherein the first inductor is positioned at a third distance from a third conductive surface;
   wherein the second inductor is positioned at a fourth distance from a fourth conductive surface.

6. The apparatus of claim 5:
   wherein the first and second conductive surfaces are portions of a first single contiguous conductive surface; and
   wherein the third and fourth conductive surfaces are portions of a second single contiguous conductive surface.

7. The apparatus of claim 6:
   wherein the first and second single contiguous conductive surfaces are metal foils.

8. The apparatus of claim 1:
   wherein the tamper detected status results in at least one from a group consisting of:
   transmission of a message blocking operation of a device, an application or a system; and
   erasure of pre-stored information in the apparatus.

* * * * *